April 26, 1949.　　　J. D. FOURNIER　　　2,468,362
HIGH-PRECISION CALIPER
Filed Sept. 19, 1946
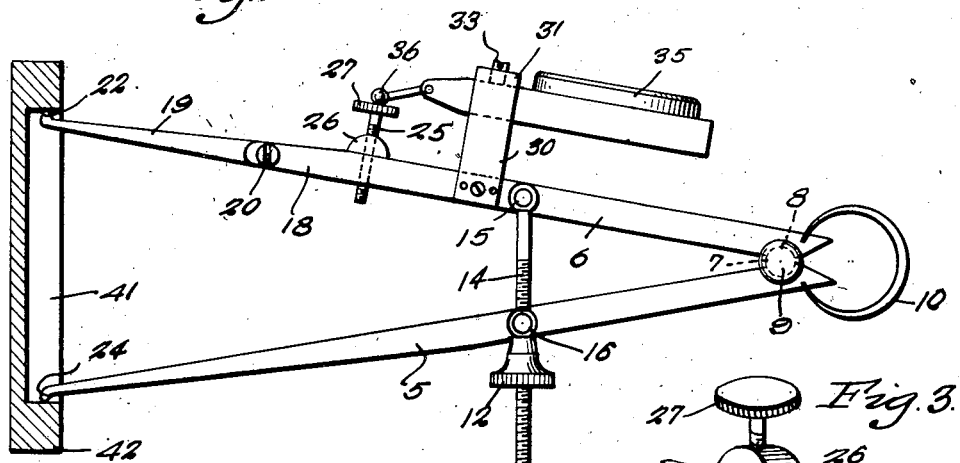
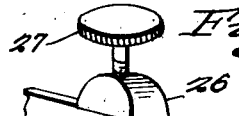
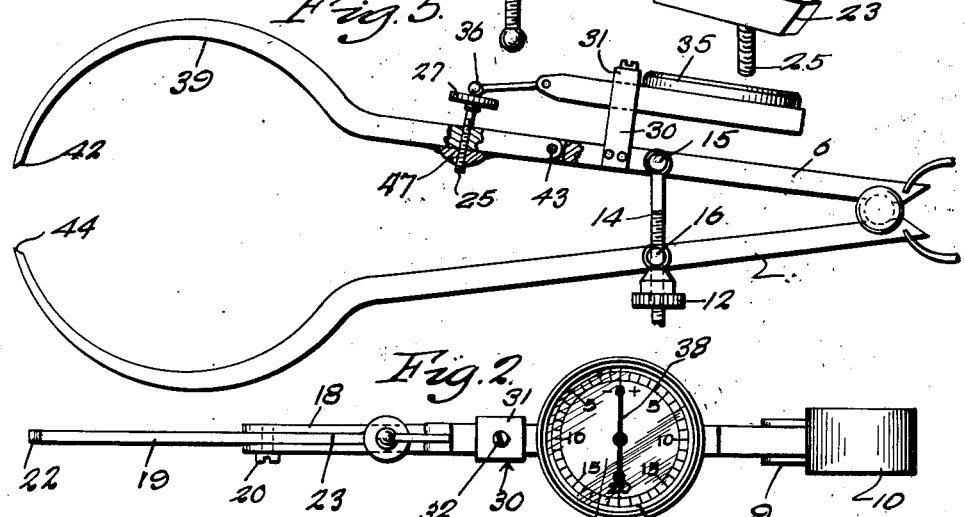
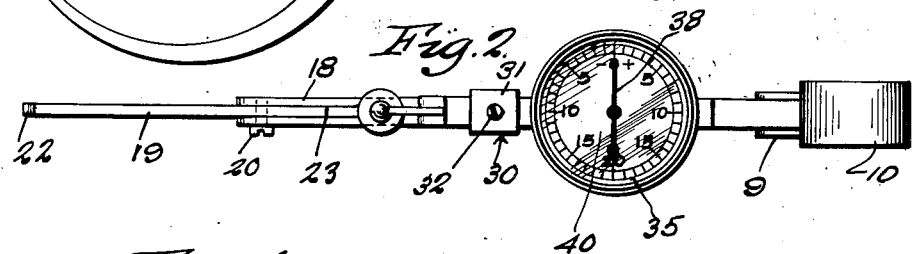
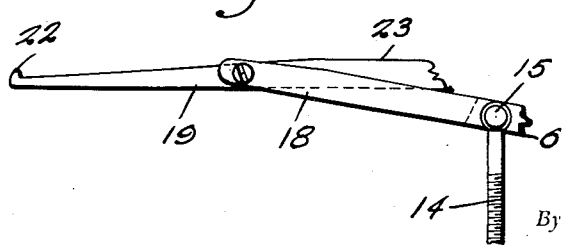
Inventor
Joseph D. Fournier
By Clarence A. O'Brien
and Harvey B. Jacobson
Attorneys Patented Apr. 26, 1949

2,468,362

UNITED STATES PATENT OFFICE 2,468,362

HIGH-PRECISION CALIPER

Joseph D. Fournier, Detroit, Mich.

Application September 19, 1946, Serial No. 697,935

1 Claim. (Cl. 33—148)

This invention relates to high precision calipers and it has for its object to provide a very simple and highly effective caliper construction permitting to obtain great accuracy while eliminating the necessity of guessing or evaluating the amount of pressure or of friction applied to the instrument while making the measurement.

A further object of the invention consists in providing a caliper construction in which the amount of pressure applied during the measurement is registered by means of members permanently kept in contact without locking means or friction.

A further object of the invention consists in providing an instrument with means held permanently in contact and in correct operative position by the spring of a spring tensioned dial indicator.

Further objects will be clear from the following specification.

It is well known that in order to perform measurements with the greatest possible accuracy calipers have either to be provided with means permitting to evaluate the pressure applied to and the consequent deformation of the legs or contact feet of the caliper, or they have to be provided with contact means which are movable with respect to the legs of the caliper and which either prevent or register the exertion or pressure causing deformation.

In order to keep the parts of the instrument in proper position for the micrometric measuring operation, however, locking means have to be provided which have to be adjusted for each measurement.

To avoid guesses as to the pressure or friction to be applied and to reduce the amount of skill, experience and care which is necessary to make accurate measurements, the caliper according to the invention is provided with an easily readable spring controlled micrometric dial indicator instrument which is coupled wth the caliper without friction by direct contact and which may preferably be so adjusted that its spring tension serves to hold the parts in operative position.

All guesses and evaluations of the pressure or friction applied and all frictional locking means are thus completely eliminated.

The invention is illustrated in the accompanying drawing showing two embodiments thereof. These specific embodiments are to be considered as an example used in order to explain the principles on which the invention is based. These examples in connection with the specification disclose to the expert the way in which the above named principles are to be applied to carry the invention into effect. Departure from the specific embodiments serving as an example does not necessarily involve a departure from the essence of the invention.

In the drawing:

Figure 1 is a view of an indicating caliper for inside measurements;

Figure 2 is a plan view of the caliper;

Figure 3 is a perspective view, and

Figure 4 is a side view of the details of the construction.

Figure 5 is a view of a caliper for outside measurements.

The caliper shown in the drawing comprises the two conventional legs 5, 6 provided with contacts points 22, 24 which are movable around a pivot 7 and which are pressed outwardly in the event of a caliper for internal measurement by means of an arcuate spring 10. The pivot 7 may be formed by a short rivet-like bolt 8 with protruding flat heads 9. The legs have arcuate cuts which are riding the portion of the bolt between the heads. They are pressed against the bolt by the spring 10 which thus serves the double purpose of holding the legs against their pivot and of forcing the outer ends apart.

The adjustment of the caliper legs 5, 6 is performed in the conventional manner. Leg 6 is provided with a pivoted boss 15 carrying a bolt 14 with fine threads which passes through a guiding boss 16 pivoted on leg 5. A nut 12 with a milled or knurled rim engages the threads of the bolt and finds its support on the guiding boss. The spring 10 keeps the boss 16 firmly pressed against the nut whatever the position of the same on the bolt.

One of the legs 6 is bifurcated as shown at 18 in Figure 2 and this portion carries a contact foot 19 which is pivoted at 20 on the foremost end of the bifurcated member. One section of the contact foot 19 carries the contact ball or contact point 22 at its end, while its rear section 23 moves between the two prongs of the bifurcated portion 18 of the leg. This rear section carries a threaded spindle 25 firmly screwed into a threaded hole of the section 23; said spindle carries a block 26 which is preferably seated on the section 23. The spindle 25 is provided with a flat disk-like head 27 having a milled or knurled rim portion, permitting the adjustment of the spindle within the section 23 and the adjustment of block 26.

The said block 26 is of greater width than the section 23 of the contact foot so that it rests on the two prongs of the bifurcated leg member 6 when pressed downwardly. It may be of semi-cylindrical or of any other convenient shape.

Behind the bifurcated member a U or channel shaped support 30 is mounted astride the leg 6. The transverse portion 31 of the said support is provided with a threaded hole 32 and on this portion a micrometric dial indicator 35 is mounted by means of a finely adjustable screw 33. The indicator is of the so-called test indicator type and is provided with a dial 40, a pointer 38 and an index point 36 on an outwardly projecting index lever which is connected with the indicating mechanism of the indicator. This indicator is a conventional, widely used instrument and its construction is not part of the invention. It registers the extent of any displacement of the index point with great accuracy using a movement including a hairspring.

The index point 36 of the indicator 35 rests on the flat head 27 of the spindle 25. Preferably the various parts are so adjusted that a certain amount of preliminary tension is given to the spring of the indicator 35 when the block 26 is at rest on the bifurcated portion 18 of leg 6.

The caliper for outside measurements comprises essentially the same members and carries the same indicator 35 constructed and mounted in the way described. However the fulcrum for the contact foot 39 carrying the contact point 42 is located at the inner end of the bifurcated portion 18 of the leg 6, and is formed by a pintle 43. Contact foot 39 also carries the screw spindle 25 provided with the disc like head 27 on which the index point 36 of the test indicator 35 rests. The block 47 carried by the spindle in this case is arranged on the inner side of the leg 6 so as to align the contact foot with the leg 6 upon pressure due to the contact of contact points 42, 44 with the surface, the distance of which has to be measured.

The way in which the caliper is used will be clear from the above description. If the caliper is adjusted in the above described manner, and if a cavity 41 in the work piece 42 is to be measured, the measurement is first carried out by adjustment of screw 12 in the usual way until contact points 22 and 24 touch the walls of the cavity. The screw 12 is now carefully turned until the dial of the indicator 35 is pressed back into its zero position. This means that the pressure exerted on the contact point is exactly equal to the preliminary tension of the instrument spring. After the caliper has been removed from the cavity, the distance between the contact points may now be measured by means of a micrometer gauge while bringing the pointer again back to zero.

This adjustment method is a mere example. The preliminary adjustments of the caliper may be made in any way which suits the individual use to which the caliper is subjected.

The operator of the calipers for external measurements is the same and will be readily understood from the foregoing description.

Changes in the mechanical construction of the caliper are obviously without influence on the present invention.

I claim:

A caliper for high precision measurements, comprising two legs pivotally connected with each other and provided with means for adjusting their angular distance, one of said legs having a contact point and the other having a bifurcated end portion, a movable contact foot pivoted to said bifurcated end portion, one section of said contact foot projecting outwardly from said bifurcated leg portion and carrying the second contact point, the other section of said contact foot being movable within the bifurcated leg portion, said other section being provided with a threaded transverse bore, a screw spindle adjustable within said bore and projecting from said section, said screw spindle carrying a flat disk at its outer end and a block adjustable on said screw spindle, said block having a flat surface applied against the contact foot but of greater width than the contact foot, being adapted to be set flatly on the bifurcated end portion, thus providing a well defined position of rest for the contact foot, a micrometric indicator adjustably mounted on the bifurcated leg, said indicator having a dial and a spring pressed index point, said indicator being adjusted for contact of the index point without pressure on the flat disk at the outer end of the screw.

JOSEPH D. FOURNIER.

REFERENCES CITED

The following references are of record in the file of this patent:

UNITED STATES PATENTS

| Number | Name | Date |
|---|---|---|
| D. 135,757 | Nelson | June 1, 1943 |
| 952,588 | Stevens | Mar. 22, 1910 |
| 1,166,868 | Tong | Jan. 4, 1916 |
| 1,274,331 | Rockwell | July 30, 1918 |
| 1,324,870 | Zito | Dec. 16, 1919 |
| 1,648,428 | Stacy | Nov. 8, 1927 |
| 2,321,443 | Windfelt | June 8, 1943 |